Aug. 9, 1932.   A. KRETZSCHMAR   1,871,122
FILTER FOR LIQUIDS
Filed Nov. 30, 1931
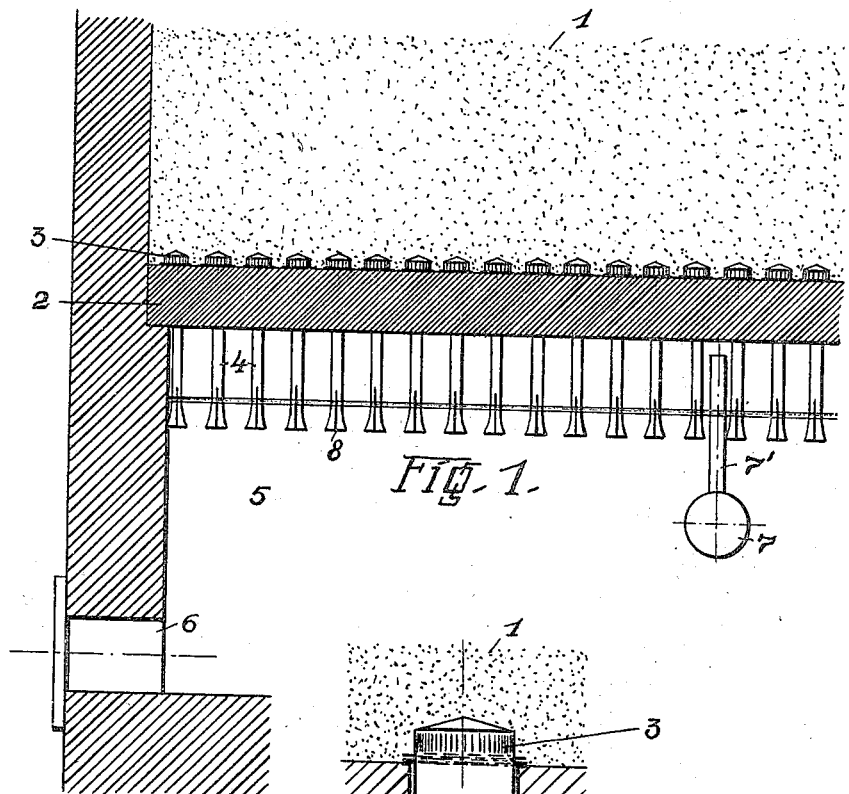
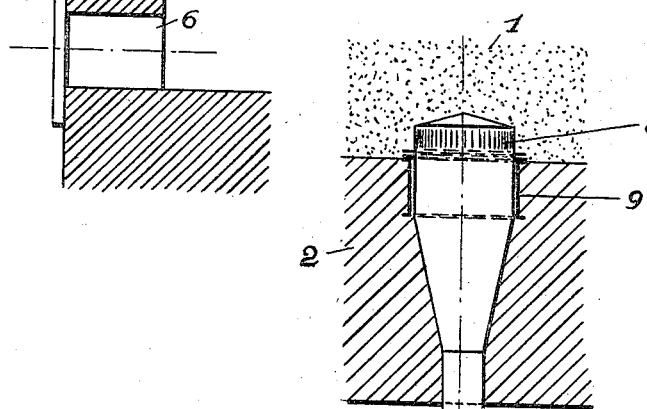
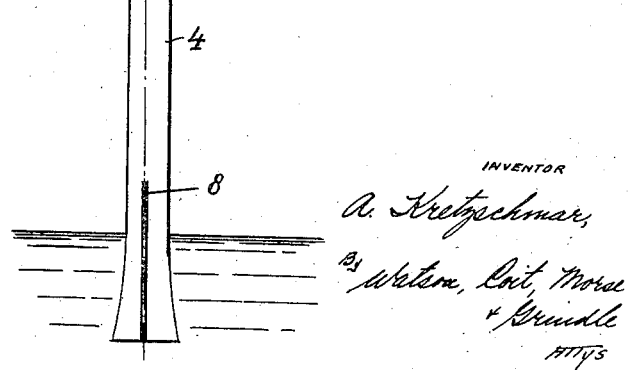

UNITED STATES PATENT OFFICE

ALFRED KRETZSCHMAR, OF BRESLAU, GERMANY

FILTER FOR LIQUIDS

Application filed November 30, 1931, Serial No. 578,070, and in Germany December 27, 1928.

My invention relates to improvements in filters for liquids, and more particularly in the apparatus for flushing the granular filtering material by means of a mixture of air under pressure and water forced through the filter bed in a direction opposite to filtering. As distinguished from filters of this type such as are now in use my improved filter comprises a horizontal bottom or partition on which the filtering material is supported, a pressure chamber provided below the said bottom and having an intake for air under pressure and flushing water, and nozzles having their delivery openings above the said bottom or partition and provided with tubular extensions passed through the said bottom or partition and into the said pressure chamber, the said tubular extensions being provided at their bottom ends with longitudinal slots the length of which is at least equal to the difference between the levels of the water produced by the air and water pressure respectively at the beginning and at the end of the flushing operation.

By the said combination results are obtained which are not obtained in filtering apparatus now in use. Below the bottom or partition on which the filtering material is supported the water is contained with an undisturbed level, the said level being different according to the degree of the impurity of the filtering bed and the volume of air and water used for cleaning the said bed. According to the said level, a larger or smaller part of the vertical slots of the said tubular extensions is laid open so as to permit the admission of air under pressure to the nozzles, the free area of the said slots being small if the level of the water is high and the degree of the impurity of the filter is small, and the said area being large if the level of the water is low and the degree of the impurity small. Thereby a uniform supply of air to the individual nozzles and a uniform flow of water from the nozzles are insured, so that the filter is uniformly cleaned all over its area. However, the delivery openings of all the nozzles and the said vertical slots of the tubular extensions should be disposed respectively at even heights, which will be readily obtained by setting the nozzles and the tubular extensions thereof in the proper positions vertically. Other results obtained by my improved construction are that the air and the water are supplied to the individual nozzles without any increase of pressure, that the individual nozzles and their tubular extensions may be disposed close to one another, and that the pressure of the mixture of air and water delivered from the nozzles is always the same in all the nozzles.

For the purpose of explaining the invention an example embodying the same has been shown in the accompanying drawing, in which the same letters of reference have been used in all the views to indicate corresponding parts. In said drawing, Fig. 1 is a sectional elevation of the filter, and Fig. 2 is a sectional elevation on an enlarged scale showing one of the nozzles and its tubular extension and the manner of mounting the same in the filter.

In the example shown in the figures the filtering bed 1 is supported on a horizontal bottom or partition 2. Above the said bottom there are flushing nozzles 3 which are passed through and fixed to the bottom 2, and which are formed with tubular extensions 4 passed into the pressure chamber 5 provided below the bottom. The said pressure chamber is provided with an intake 6 for water and with an intake for air under pressure, the said intake comprising a main pipe 7 provided with upwardly directed branch pipes 7'. The tubular extensions have outwardly flaring bottom ends, and at their bottom ends they are formed with longitudinal slots 8. In the construction shown in Fig. 2 each nozzle 3 is made integral with its tubular extension 4, and it is formed with external screw-threads by means of which it is screwed in an internally screw-threaded sleeve 9 embedded in the bottom 2. Thereby the nozzles and their tubular extensions may be readily adjusted in vertical direction.

For cleaning the filter water and air under pressure are admitted to the pressure chamber 5 through intakes 6 and 7, 7', whereby the water contained within the said chamber is expelled downwardly by the air cushion produced at the top part of the pressure chamber. Thus the water arranges itself with a quiet surface within the pressure chamber, the level of the water being such that the slots 8 project more or less above the surface of the water, and air under pressure rushes through the portion of the slots located above the surface of the water and through the tubular extensions to the nozzles 3, from whence it is delivered into the filtering bed. According to the volume of mud and the amount of the air or flushing water the water within the pressure chamber arranges itself at a lower or higher level, and accordingly smaller or larger parts of the areas of the slots are laid open for the admission of air under pressure. To obtain this result, the length of the longitudinal slots must be at least equal to the difference between the highest and lowest levels of the water within the pressure chamber during the filtering operation.

I claim:

1. A filter, comprising a filtering bed, a bottom supporting the same, a chamber provided below the said bottom and having intakes one for water and the other for air under pressure, and nozzles above the said bottom for the delivery of flushing water and air through the filtering bed, said nozzles being provided with tubular extensions passed through the said bottom and into the said pressure chamber and formed at their bottom ends with longitudinal slots the length of which is at least equal to the difference between the highest and lowest level of the water produced during the flushing operation within the pressure chamber by the pressure of air and water.

2. A filter, comprising a filtering bed having a supporting base, a chamber below the base provided with means for introducing water and air under pressure therein, and conduits extending within the bed for delivering flushing water and air therethrough, said conduits passing through the base and into the chamber and being apertured adjacent their lower ends over a portion thereof extending from points respectively above and below the highest and lowest level of the water occurring during the flushing operation.

In testimony whereof I hereunto affix my signature.

ALFRED KRETZSCHMAR.